(12) United States Patent
    Matsushita

(10) Patent No.: US 8,800,159 B2
(45) Date of Patent: Aug. 12, 2014

(54) METHOD FOR CALCULATING ERROR COMPENSATION VALUE OF MACHINE

(75) Inventor: Tetsuya Matsushita, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 214 days.

(21) Appl. No.: 13/446,316

(22) Filed: Apr. 13, 2012

(65) Prior Publication Data

US 2012/0304478 A1   Dec. 6, 2012

(30) Foreign Application Priority Data

May 30, 2011   (JP) .................................. 2011-120819

(51) Int. Cl.
    *G01C 25/00*   (2006.01)
    *G01B 5/00*    (2006.01)
    *G01B 21/04*   (2006.01)

(52) U.S. Cl.
    CPC ............ *G01B 5/0011* (2013.01); *G01B 21/045* (2013.01)
    USPC .............................................. 33/702; 33/503

(58) Field of Classification Search
    CPC .. G01B 5/0011; G01B 5/0014; G01B 5/0016; G01B 21/042; G01B 21/045
    USPC .................................................... 33/702, 503
    See application file for complete search history.

(56) References Cited

U.S. PATENT DOCUMENTS

| 4,945,501 | A   | * | 7/1990  | Bell et al. ..................... 702/95 |
| 5,329,457 | A   | * | 7/1994  | Hemmerle et al. ............ 700/193 |
| 5,471,406 | A   | * | 11/1995 | Breyer et al. ................. 702/168 |
| 5,492,440 | A   | * | 2/1996  | Spaan et al. .................... 409/80 |
| 5,841,668 | A   | * | 11/1998 | Pahk et al. ..................... 700/160 |
| 6,540,454 | B2  | * | 4/2003  | Tanaka et al. ................. 409/131 |
| 7,245,982 | B2  | * | 7/2007  | Morfino ......................... 700/174 |
| 7,392,692 | B2  | * | 7/2008  | Noda ............................... 73/105 |
| 7,599,813 | B2  | * | 10/2009 | Grupp ............................ 702/152 |
| 8,001,859 | B2  | * | 8/2011  | McMurtry et al. ........... 73/866.5 |
| 8,452,564 | B2  | * | 5/2013  | Balsamo et al. ................ 702/95 |
| 8,567,084 | B2  | * | 10/2013 | Ogihara et al. ................. 33/553 |
| 2007/0010959 | A1 | * | 1/2007 | Chang et al. .................... 702/94 |
| 2010/0169721 | A1 | * | 7/2010 | Chang et al. .................... 714/57 |
| 2012/0105866 | A1 | * | 5/2012 | Pettersson et al. ............ 356/601 |
| 2013/0173199 | A1 | * | 7/2013 | Guasco ............................ 702/95 |

FOREIGN PATENT DOCUMENTS

JP        2004-272887  A1     9/2004

* cited by examiner

*Primary Examiner* — Christopher Fulton
(74) *Attorney, Agent, or Firm* — Burr & Brown, PLLC

(57) ABSTRACT

When calculating a compensation value for a geometric error, a first index representing an order of connection of drive axes in a machine and a second index representing an order of connection of the drive axes including the geometric error are obtained. Then, a first vector is obtained by performing a matrix operation of a reference vector according to information on the connection in the first index, and a second vector is obtained by performing the matrix operation of the reference vector according to information on the connection in the second index. Thereafter, a difference between the first vector and the second vector is obtained as the compensation value.

2 Claims, 8 Drawing Sheets

FIG. 4

| - | - | C | A | Y | g | X | Z |

FIG. 5

| - | - | - | C | A | Y | X | Z |

FIG. 6

| - | - | - | - | - | Y | X | Z |

FIG. 7

| - | - | - | - | - | $\varepsilon_{WC}$ | C | $\varepsilon_{CA}$ | A | $\varepsilon_{AY}$ | Y | $\varepsilon_{YX}$ | X | $\varepsilon_{XZ}$ | Z | $\varepsilon_{ZT}$ |

FIG. 8

| - | - | - | $A^{-1}$ | $C^{-1}$ | $\varepsilon_{WC}$ | C | $\varepsilon_{CA}$ | A | $\varepsilon_{AY}$ | Y | $\varepsilon_{YX}$ | X | $\varepsilon_{XZ}$ | Z | $\varepsilon_{ZT}$ |

FIG. 11

| - | - | g | X | Y | Z | C | B |

FIG. 12

| - | - | - | X | Y | Z | C | B |

FIG. 13

| - | - | - | - | - | $\varepsilon_{WX}$ | X | $\varepsilon_{XY}$ | Y | $\varepsilon_{YZ}$ | Z | $\varepsilon_{ZC}$ | C | $\varepsilon_{CB}$ | B | $\varepsilon_{BT}$ |

METHOD FOR CALCULATING ERROR COMPENSATION VALUE OF MACHINE

This application claims the benefit of Japanese Patent Application Number 2011-120819 filed on May 30, 2011, the entirety of which is incorporated by reference.

BACKGROUND OF INVENTION

1. Field of the Invention

The present invention relates to calculation methods for calculating a compensation value for compensating for a geometric error of a machine such as a multiaxis machine tool and a robot.

2. Description of the Related Art

Five-axis controlled machine tools (a five-axis machining center etc.), in which two rotational axes are added to a conventional three-axis machining center in order to achieve efficient machining or to machine a workpiece in a complex shape, are known as a type of machine. One factor that affects motion accuracy of the five-axis controlled machine tool and shape accuracy of the workpiece is a geometric error between the axes, such as parallelism between a rotational axis and a translational axis and displacement between the rotation centers of the rotational axes. It is very difficult to eliminate such a geometric error when manufacturing the five-axis controlled machine tools. Thus, as in Japanese Patent Application Publication No. 2004-272887 (JP 2004-272887 A), a method for controlling a five-axis controlled machine tool has been proposed in which the five-axis controlled machine tool is controlled in view of displacement between the centers of the rotational axes and a tilt error of the rotational axes, and the axes are driven while compensating for a command position of each axis so that the relative relation between a tool and a workpiece becomes the same as that in a machine having no error.

When calculating a compensation value in the control method of JP 2004-272887 A, an operation of drive axes forming a machine and a geometric error included therein are obtained by performing multiplication of 4-row by 4-column matrices. Five-axis controlled machine tools are classified into three types according to the axis configuration, namely a main spindle rotation type, a table rotation type, and a main spindle-table rotation type, and a compensation value for a geometric error is calculated by using different formulae for each type. In any type of five-axis controlled machine tool, multiplication of a 4-row by 4-column matrix and a 4-row by 1-column matrix as shown by the following expression 1 is performed to calculate a compensation value.

$$\begin{bmatrix} a_1 & a_2 & a_3 & a_4 \\ b_1 & b_2 & b_3 & b_4 \\ c_1 & c_2 & c_3 & c_4 \\ d_1 & d_2 & d_3 & d_4 \end{bmatrix} \begin{bmatrix} h \\ i \\ j \\ k \end{bmatrix} = \begin{bmatrix} a_1 \cdot h + a_2 \cdot i + a_3 \cdot j + a_4 \cdot k \\ b_1 \cdot h + b_2 \cdot i + b_3 \cdot j + b_4 \cdot k \\ c_1 \cdot h + c_2 \cdot i + c_3 \cdot j + c_4 \cdot k \\ d_1 \cdot h + d_2 \cdot i + d_3 \cdot j + d_4 \cdot k \end{bmatrix} \quad \text{[Expression 1]}$$

However, the method for calculating a compensation value of a geometric error described in JP 2004-272887 A is not versatile because a compensation value is calculated by using different formulae according to the type of five-axis controlled machine tool. Moreover, the multiplication of the 4-row by 4-column matrix and the 4-row by 1-column matrix, which is performed in the method for calculating a compensation value of a geometric error described in JP 2004-272887 A, requires an enormous amount of calculation, namely 12 additions and 16 multiplications. Thus, the calculation method described in JP 2004-272887 A has very low efficiency and requires a central processing unit (CPU) having high processing performance.

SUMMARY OF THE INVENTION

It is an object of the present invention to provide a versatile, practical method (an error compensation value calculation method) for calculating an error compensation value of a machine, which solves the problems of the conventional method for calculating a compensation value for a geometric error, and allows a compensation value for a geometric error to be efficiently calculated in any type of multiaxis controlled machine tools by a common method. Further, an object of the present invention is to provide a practical method for calculating an error compensation value for a geometric error by an inexpensive CPU mounted to a machine tool.

An invention according to a first aspect (hereinafter referred to as the "first invention") is a method for calculating a compensation value that compensates for a geometric error of a machine, including obtaining a first index representing an order of connection of drive axes in the machine and a second index representing an order of connection of the drive axes including the geometric error, obtaining a first vector by performing a matrix operation of a reference vector according to information on the order of connection in the first index, obtaining a second vector by performing the matrix operation of the reference vector according to information on the order of connection in the second index, and obtaining a difference between the first vector and the second vector as the compensation value.

An invention according to a second aspect (hereinafter referred to as the "second invention") is a method for calculating a compensation value that compensates for a geometric error of a machine, including obtaining a first index representing an order of connection of drive axes in the machine and a second index representing an order of connection of the drive axes including the geometric error, obtaining a first vector by performing a calculation process, which is associated in advance with each element in the indices according to a type of the element, on a reference vector according to information on the connection in the first index, obtaining a second vector by performing the calculation process on the reference vector according to information on the connection in the second index, and obtaining a difference between the first vector and the second vector as the compensation value.

The error compensation value calculation method according to the present invention is versatile, and allows a compensation value for a geometric error to be calculated by a common method in any type of five-axis controlled machine tool (or machine tool that controls 4 axes or less, or 6 axes or more). The error compensation value calculation method according to the present invention can reduce the amount of calculation, and can implement efficient calculation of a compensation value for a geometric error. Moreover, the error compensation value calculation method according to the present invention is a method for calculating an error compensation value for a geometric error by an inexpensive CPU mounted to a machine tool.

BRIEF DESCRIPTION OF DRAWINGS

FIG. 4 is a conceptual diagram of a kinematic chain representing an axis configuration of the machine tool.

FIG. 5 is a conceptual diagram of an I-chain showing the order of the calculation where transformation from the tool coordinates system to the workpiece coordinate system is made when the machine tool has no geometric error.

FIG. 6 is a conceptual diagram of an I-chain showing the order of the calculation where transformation the tool coordinates system to the command value coordinate system is made when the machine tool has no geometric error.

FIG. 7 is a conceptual diagram of an R-chain showing the order of calculation where transformation from the tool coordinates system to the workpiece coordinate system is made when the machine tool has geometric errors.

FIG. 8 is a conceptual diagram of an R-chain showing the order of calculation where transformation from the tool coordinates system to the command value coordinate system is made when the machine tool has geometric errors.

FIG. 11 is a conceptual diagram of a kinematic chain representing an axis configuration of the machine tool.

FIG. 12 is a conceptual diagram of an I-chain showing the order of calculation in the machine tool having no geometric error.

FIG. 13 is a conceptual diagram of an R-chain showing the order of calculation in the machine tool having geometric errors.

DETAILED DESCRIPTION OF THE INVENTION

Embodiments of a method (an error compensation value calculation method) for calculating a compensation value for compensating for a geometric error according to the present invention (the first invention and the second invention) will be described in detail below with reference to the accompanying drawings.

First Embodiment

Figure 1:
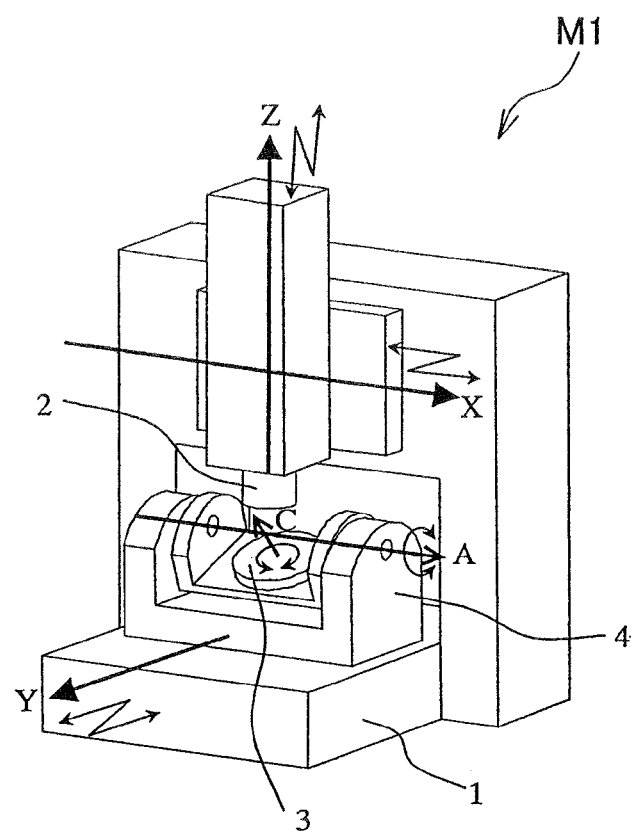
FIG. 1 is a schematic diagram (a perspective view) showing a five-axis controlled machine tool having an X-axis, a Y-axis, and a Z-axis as translational axes, and having an A-axis and a C-axis as rotational axes on the table side.

A first embodiment will be described with respect to an example in which a compensation value is calculated by the error compensation value calculation method of the first invention in a five-axis controlled machine tool having two rotational axes on the table side as shown in FIG. 1.

<Configuration of Multiaxis Machine Tool>

FIG. 1 shows a five-axis controlled machine tool (a five-axis control machining center) having three translational axes and two rotational axes (hereinafter simply referred to as the "machine tool M1"). A spindle head 2, a table 3, and a trunnion unit 4 are provided on a bed (a base) 1 of the machine tool M1 so that driving of the spindle head 2, the table 3, and the trunnion unit 4 can be controlled. The spindle head 2 is capable of two-degree-of-freedom translational movement by an X-axis and a Z-axis as translational axes extending perpendicularly to each other. The table 3 is capable of two-degree-of-freedom rotational movement by an A-axis and a C-axis as rotational axes included in the trunnion unit 4 and extending perpendicularly to each other. The table 3 is also capable of one-degree-of-freedom translational movement by a Y-axis as a translational axis extending perpendicularly to the X-axis and the Z-axis. This machine tool M1 can machine a workpiece, which is fixed to the table 3, into any shape by using a tool mounted on the spindle head 2, by controlling driving of the X, Y, Z, A, and C-axes with servo motors (not shown) by using an NC control device (see FIG. 2).

Figure 2:
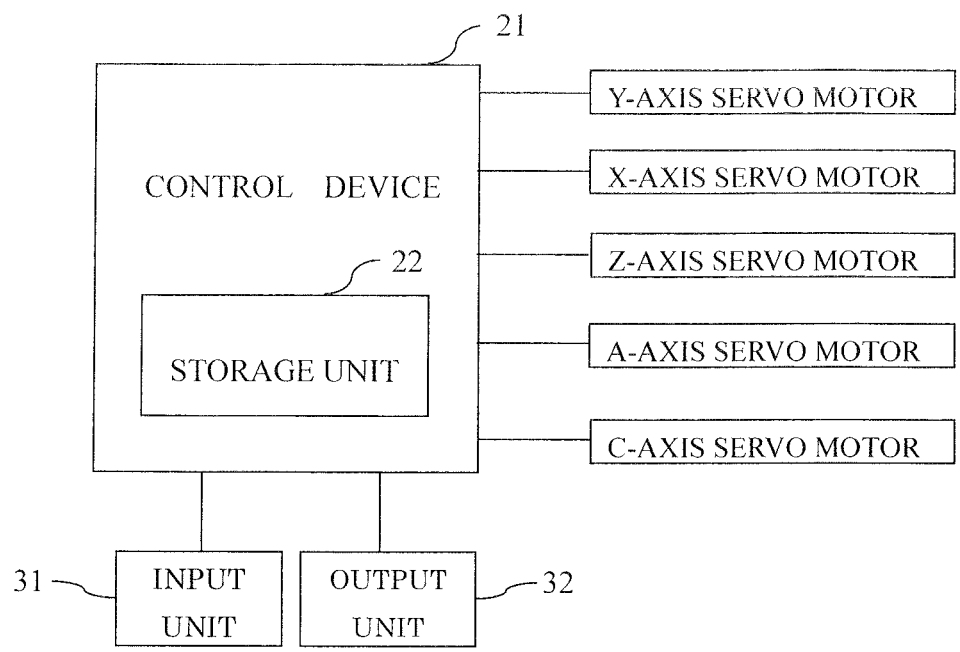
FIG. 2 is a block diagram showing a control mechanism of the five-axis controlled machine tool.

FIG. 2 is a block diagram showing a control mechanism of the machine tool M1. Driving of each servo motor configured to cause the spindle head 2, the table 3, and the trunnion unit 4 to translate and each servo motor configured to rotate the table 3 are controlled by an NC control device 21. Elements such as an input unit 31 configured to set an indexing position (indexing conditions) etc. and an output unit 32 configured to output the calculation result of a compensation value for a geometric error, etc. are connected to the NC control device 21. The NC control device 21 is provided with a storage unit 22, and a program storage region configured to store various programs for calculating a compensation value for a geometric error, a variable storage region configured to store variables that are used in various arithmetic operations, etc., are provided in the storage unit 22.

<Error Compensation Value Calculation Method>

In the machine tool M1 described above, the drive axes from the tool mounted on the spindle head 2 to the workpiece that is fixed to the table 3 are connected in the order of the Z-axis, the X-axis, the Y-axis, the A-axis, and the C-axis, and the position of the bed 1 that is fixed to the outside world, namely a ground coordinate system, is located between the Y-axis and the X-axis. The reference character "g" represents this ground coordinate system, and "CAYgXZ" represents connection of the axes of the machine tool M1. In the following description, such connection representing an axis configuration is generally referred to as the "kinematic chain (K-chain)".

It is herein assumed that the tool mounted on the spindle head 2 of the machine tool M has a length "T," and command values for the X-axis, the Y-axis, the Z-axis, the A-axis, and the C-axis are "x," "y," "z," "a," and "c," respectively. If the machine tool M1 has no geometric error, a tool center point vector $^{W}P_I$ in a workpiece coordinate system can be obtained from the following expression 2 by performing homogenous transformation according to the kinematic chain by using a tool center point vector $^{T}P$ in a tool coordinate system.

[Expression 2]

$$M_C = \begin{bmatrix} \cos c & -\sin c & 0 & 0 \\ \sin c & \cos c & 0 & 0 \\ 0 & 0 & 1 & 0 \\ 0 & 0 & 0 & 1 \end{bmatrix},$$

$$M_A = \begin{bmatrix} 1 & 0 & 0 & 0 \\ 0 & \cos a & -\sin a & 0 \\ 0 & \sin a & \cos a & 0 \\ 0 & 0 & 0 & 1 \end{bmatrix}$$

$$M_Y = \begin{bmatrix} 1 & 0 & 0 & 0 \\ 0 & 1 & 0 & y \\ 0 & 0 & 1 & 0 \\ 0 & 0 & 0 & 1 \end{bmatrix}, M_X = \begin{bmatrix} 1 & 0 & 0 & x \\ 0 & 1 & 0 & 0 \\ 0 & 0 & 1 & 0 \\ 0 & 0 & 0 & 1 \end{bmatrix},$$

-continued $$M_Z = \begin{bmatrix} 1 & 0 & 0 & 0 \\ 0 & 1 & 0 & 0 \\ 0 & 0 & 1 & z \\ 0 & 0 & 0 & 1 \end{bmatrix}, {}^T P = \begin{bmatrix} 0 \\ 0 \\ -T \\ 1 \end{bmatrix}$$

If a geometric error is present between the axes as a relative error $\epsilon$ in six-degree-of-freedom, a tool center point vector ${}^W P_R$ in the workpiece coordinate system in the case where there is a geometric error is represented by the following expression 3.

$${}^W P_R = \varepsilon_{WC} \cdot M_C \cdot \varepsilon_{CA} \cdot M_A \cdot$$
$$\varepsilon_{AY} \cdot M_Y \cdot \varepsilon_{YX} \cdot M_X \cdot \varepsilon_{XZ} \cdot M_Z \cdot \varepsilon_{ZT} \cdot {}^T P$$ [Expression 3]

$$\varepsilon_* = \begin{bmatrix} 1 & -\gamma_* & \beta_* & \delta x_* \\ \gamma_* & 1 & -\alpha_* & \delta y_* \\ -\beta_* & \alpha_* & 1 & \delta z_* \\ 0 & 0 & 0 & 1 \end{bmatrix}$$

Thus, a position error vector ${}^W\Delta P$ of a tool center point in the workpiece coordinate system is represented by the following expression 4.

$${}^W\Delta P = {}^W P_R - {}^W P_I$$ [Expression 4]

A position error vector ${}^O\Delta P$ in a command value coordinate system, which is obtained by converting the position error vector to a coordinate system of the command values, can be used as a compensation value of the X, Y, and Z-axes for compensating for this error. The position error vector ${}^O\Delta P$ can be obtained from the following expression 5. That is, the command coordinate system is located between the Y-axis and the A-axis, and transformation from the workpiece coordinate system to the command value coordinate system can be obtained by performing multiplication in the order of the C-axis and the A-axis in the inverse matrix from the workpiece coordinate system.

$${}^O\Delta P = M_A^{-1} \cdot M_C^{-1} \cdot ({}^W P_R - {}^W P_I)$$ [Expression 5]

The tool center point vector ${}^O P_I$ in the case where there is no error and the tool center point vector ${}^O P_R$ in the case where there is an error, which are obtained by transformation from the workpiece coordinate system to the command value coordinate system from the above expressions 2 to 5, can be represented by the following expressions 6 and 7, respectively.

$${}^O P_I = M_A^{-1} \cdot M_C^{-1} \cdot M_C \cdot M_A \cdot M_Y \cdot M_X \cdot M_Z \cdot {}^T P = M_Y \cdot M_X \cdot M_Z \cdot {}^T P$$ [Expression 6]

$${}^O P_R = M_A^{-1} \cdot M_C^{-1} \cdot \varepsilon_{WC} \cdot M_C \cdot \varepsilon_{CA} \cdot M_A \cdot \varepsilon_{AY} \cdot M_Y \cdot \varepsilon_{YX} \cdot M_X \cdot \varepsilon_{XZ} \cdot M_Z \cdot \varepsilon_{ZT} \cdot {}^T P$$ [Expression 7]

Thus, the position error vector ${}^O\Delta P$ as a compensation value can also be obtained from the following expression 8.

$${}^O\Delta P = {}^O P_R - {}^O P_I$$ [Expression 8]

A compensation value of a five-axis controlled machine tool having two rotational axes on the table side like the machine tool M1 can be obtained from the above expressions 6 to 8 (as described below, in other types of machine tools, a compensation value need be obtained by using other expressions).

Second Embodiment

A second embodiment will be described with respect to an example in which the error compensation value calculation method according to the first invention is changed so that this method can be commonly used in all types of machine tools. In such a calculation method, both an I-chain representing an axis configuration from the tool to the workpiece in the case where there is no geometric error and an R-chain representing an axis configuration from the tool to the workpiece in the case where there is a geometric error are obtained based on the above kinematic chain, and a geometric error parameter is set, in a process of initializing the NC control device that controls the machine tool.

Figure 3:
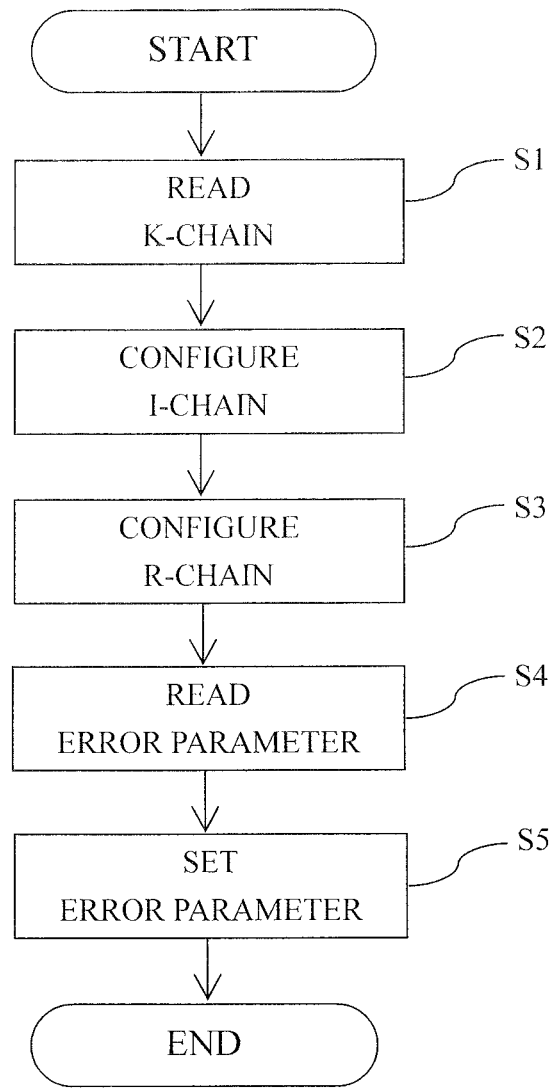
FIG. 3 is a flowchart illustrating a process that is performed when starting the machine tool.

FIG. 3 illustrates a process that is performed when initializing the NC control device 21. In this initialization process, the kinematic chain (the K-chain) described above is first stored in advance in the storage unit 22 of the NC control device 21 in step S1. At this time, the name of each axis in the kinematic chain is replaced with a numeral or a symbol. FIG. 4 is a conceptual diagram of the stored kinematic chain, in which the right side represents the side of the tool, and the left side represents the side of the workpiece.

Next, in S2, connection information associated with the connection of the axes is read from the stored kinematic chain to create an I-chain representing an axis configuration from the tool to the workpiece in case where there is no geometric error. FIG. 5 is a conceptual diagram of the created I-chain. Since the I-chain need be converted to the command value coordinate system in order to obtain a compensation value, the elements are inversely followed from the workpiece coordinate system to the command value coordinate system, and are offset when possible as shown in the above expression 6, whereby the I-chain is updated as shown in FIG. 6. It can be determined that the command coordinate system is located between the A-axis and the Y-axis (that is, between the first rotational axis and the translational axis, which are located on the side of the workpiece from the ground coordinate system in the kinematic chain).

Similarly, an R-chain representing an axis configuration from the tool to the workpiece in the case where there is a geometric error is created in S3 as shown in FIG. 7. The elements are inversely followed from the workpiece coordinate system to the command value coordinate system, and the R-chain is updated as shown in FIG. 8.

In S4, a geometric error parameter stored in advance in the storage unit 22 is read, and is set as a geometric error parameter in S5. This geometric error parameter may be a parameter that can be varied by influences such as thermal displacement, deformation by gravity, and straightness error of the translational axis.

Figure 9:
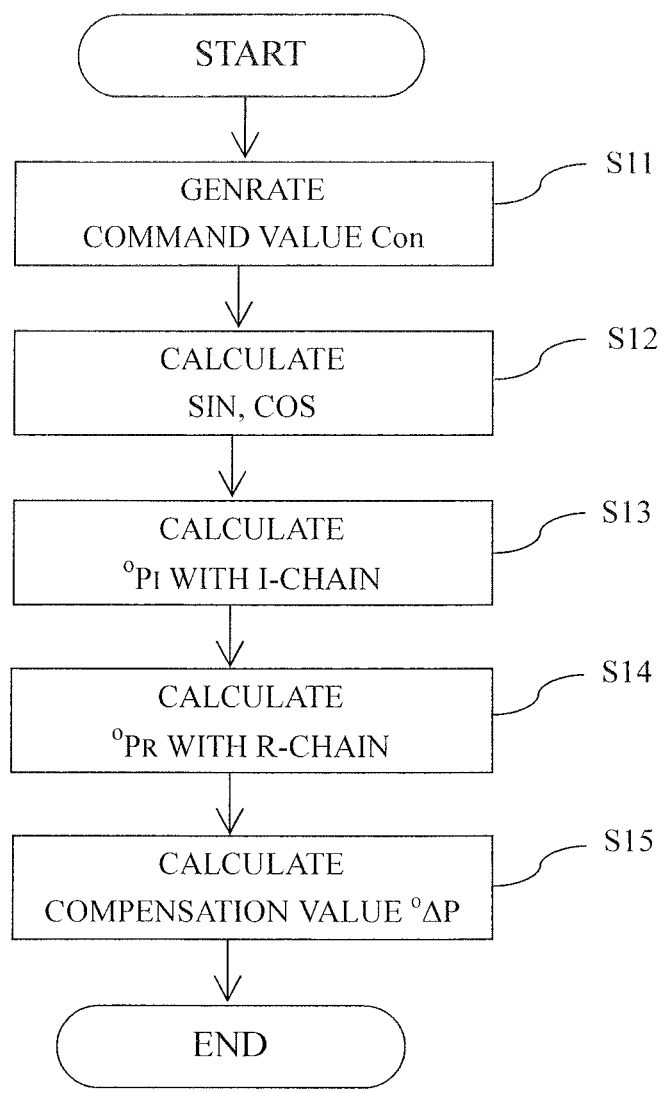
FIG. 9 is a flowchart illustrating a process of calculating a compensation value for geometric errors of the machine tool.

The method for calculating a compensation value during axis operation will be described below according to the flowchart of FIG. 9. When calculating the compensation value, the NC control device 21 first reads an input NC program and interprets the NC program to generate a command value for each axis in S11. Next, in S12, the NC control device 21 calculates sine and cosine for the generated command values for the rotational axes. Moreover, the NC control device 21 prepares a transformation matrix for the command value for each axis. The NC control device 21 further prepares a geometric error matrix by using the geometric error parameter obtained (set) in the initialization process of the NC control device 21. In this process as well, the geometric error parameter may be a parameter that can be varied by thermal displacement, deformation by gravity or inertial force, straightness error of the translational axis, etc.

Then, in S13, the NC control device 21 multiplies the tool center point vector ${}^T P$ in the tool coordinate system by each transformation matrix according to the order of the axes in the 1-chain to obtain the tool center point vector $^{O}P_I$ in the command value coordinate system.

In S14, the NC control device 21 further multiplies the tool center point vector $^{T}P$ in the tool coordinate system in the case where there is a geometric error by each transformation matrix according to the order of the axes in the R-chain to obtain the tool center point vector $^{O}P_R$ in the command value coordinate system in the case where there is an error.

Thereafter, the compensation value $^{O}\Delta P$ is obtained by using the above expression 8.

Third Embodiment

Figure 10:
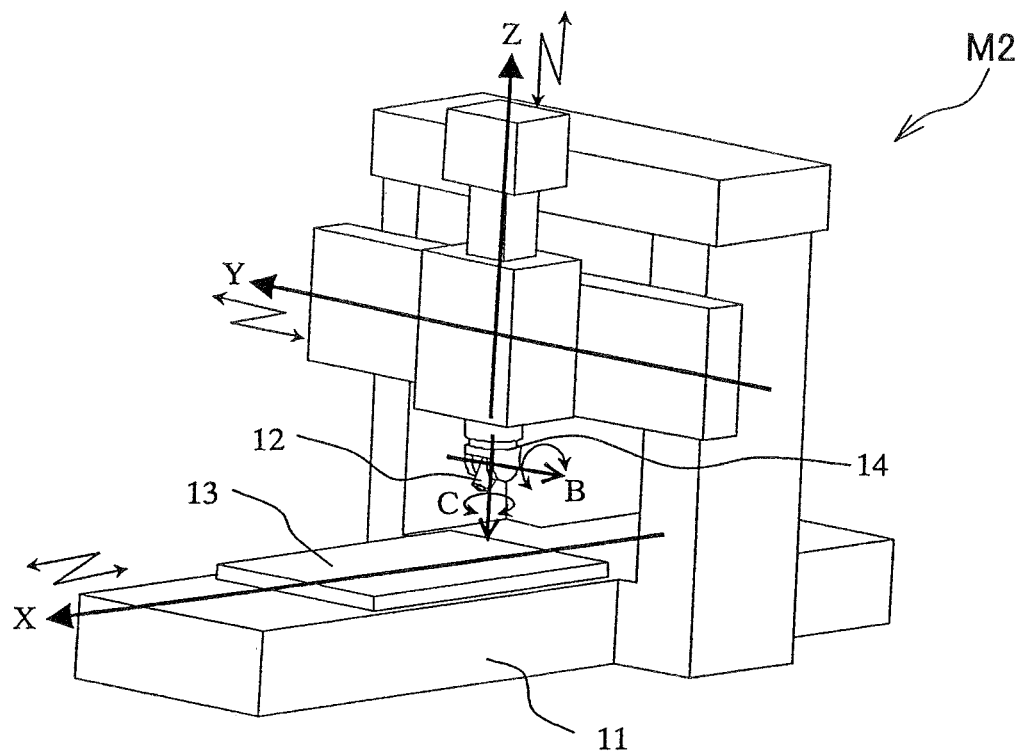
FIG. 10 is a schematic diagram (a perspective view) showing a five-axis controlled machine tool having an X-axis, a Y-axis, and a Z-axis as translational axes, and having a B-axis and a C-axis as rotational axes on the spindle side.

A third embodiment will be described with respect to an example in which a compensation value is obtained by the error compensation value calculation method according to the first invention in a five-axis controlled machine tool having two rotational axes on the spindle head 12 side as shown in FIG. 10. In a machine tool M2 of FIG. 10, a spindle head 12 is capable of two-degree-of-freedom translational movement by a Y-axis and a Z-axis as translational axes extending perpendicularly to each other. The spindle head 12 is also capable of two-degree-of-freedom rotational movement by a B-axis and a C-axis as rotational axes contained in a universal head 14 and extending perpendicularly to each other. A table 13 is movable in one translational degree of freedom by an X-axis as a translational axis extending perpendicularly to the Y-axis and the Z-axis. This machine tool M2 can machine a workpiece, which is fixed to the table 13, into any shape by using a tool mounted on the spindle head 12, by controlling driving of the X, Y, Z, B, and C-axes with servo motors (not shown) by using an NC control device (not shown) (a control mechanism of the machine tool M2 in the third embodiment is substantially similar to that of the machine tool M1 of the first and second embodiments).

In the machine tool M2, the drive axes from the tool to the workpiece are connected in the order of the B-axis, the C-axis, the Z-axis, the Y-axis, and the X-axis, and the kinematic chain can be described as "XgYZCB." Thus, the kinematic chain can be represented as shown in FIG. 11. Since the command value coordinate system is located on the left side of "X," the I-chain can be represented as shown in FIG. 12, and the R-chain can be represented as shown in FIG. 13. The tool center point vector $^{O}P_1$ in the command value coordinate system can be calculated by the following expression 9, and the tool center point vector $^{O}P_R$ in the command value coordinate system can be calculated by the following expression 10 according to the chains shown in FIGS. 12 and 13. The position error vector $^{O}\Delta P$ as a compensation value can be obtained by the above expression 8.

$$^{O}P_I = M_X \cdot M_Y \cdot M_Z \cdot M_C \cdot M_B \cdot {}^{T}P \quad \text{[Expression 9]}$$

$$^{O}P_R = \epsilon_{WX} \cdot Mx \cdot \epsilon_{XY} \cdot M_Y \cdot \epsilon_{YZ} \cdot M_Z \cdot \epsilon_{ZC} \cdot M_C \cdot \epsilon_{CB} \cdot M_B \cdot \epsilon_{CT} \cdot {}^{T}P \quad \text{[Expression 10]}$$

Fourth Embodiment

A fourth embodiment will be described with respect to an example in which a compensation value is calculated by the error compensation value calculation method according to the second invention. In the first to third embodiments according to the first invention, matrix multiplication is performed according to the elements of the I-chain and the R-chain. In the calculation method of the fourth embodiment, the matrix multiplication is classified according to the element, and a calculation process is performed according to the type of element. That is, the following process is performed according to each case. A reference vector P to be converted is represented by $P=[Px, Py, Pz]^t$.

(1) In the Case where the Element is X, Y, or Z

In this case, one addition is performed only on a corresponding vector element. For example, in the case of "X," addition is performed only on "Px" as shown by the following expression 11 to update the reference vector P.

$$Px \leftarrow Px + x \quad \text{[Expression 11]}$$

(2) In the Case where the Element is A, B, or C

In this case, two additions and four multiplications are performed on two elements other than a vector element corresponding to an axis parallel to the designated rotational axis. For example, in the case of "A," addition and multiplication are performed on "Py" and "Pz" as shown by the following expression 12 to update the reference vector P. Cosine and sine obtained in advance as described above are used in this case.

$$Py \leftarrow Py \cdot \cos(a) + Pz \cdot \{-\sin(a)\}$$

$$Pz \leftarrow Py \cdot \sin(a) + Pz \cdot \cos(a) \quad \text{[Expression 12]}$$

(3) In the Case where the Element is $A^{-1}$, $B^{-1}$, or $C^{-1}$

In this case, as in the case where the element is A, B, or C, two additions and four multiplications are performed on two elements other than a vector element corresponding to an axis parallel to the designated rotational axis, but the sign of sine is reversed in this case. For example, in the case of "$A^{-1}$" addition and multiplication are performed on "Py" and "Pz" as shown by the following expression 13 to update the reference vector P. Cosine and sine obtained in advance as described above are used in this case.

$$Py \leftarrow Py \cdot \cos(a) + Pz \cdot \sin(a)$$

$$Pz \leftarrow Py \cdot \{-\sin(a)\} + Pz \cdot \cos(a) \quad \text{[Expression 13]}$$

(4) In the Case where the Element is $\epsilon$ ($\epsilon_{WC}, \epsilon_{CA}, \epsilon_{AY}, \epsilon_{YX}, \epsilon_{XZ}, \epsilon_{ZT}$)

In this case, nine additions and six multiplications are performed by using a corresponding geometric error parameter $\alpha^*, \beta^*, \gamma^*, \delta x^*, \delta y^*, \delta z^*$ of the element $\epsilon$. For example, the following expression 14 is used in the case of "$\epsilon_{AY}$." Although all of the six parameters are calculated in this description, a value may not be applied to all of the six parameters, depending on the element $\epsilon$. Thus, calculation may be subdivided and performed according to each case.

$$Px \leftarrow Px - \gamma_{AY} \cdot Py + \beta_{AY} \cdot Pz + \delta x_{AY}$$

$$Py \leftarrow Py + \gamma_{AY} \cdot Px - \alpha_{AY} \cdot Pz + \delta y_{AY}$$

$$Pz \leftarrow Pz - \beta_{AY} \cdot Px + \alpha_{A_y} \cdot Py + \delta y_{AY} \quad \text{[Expression 14]}$$

Figure 14:
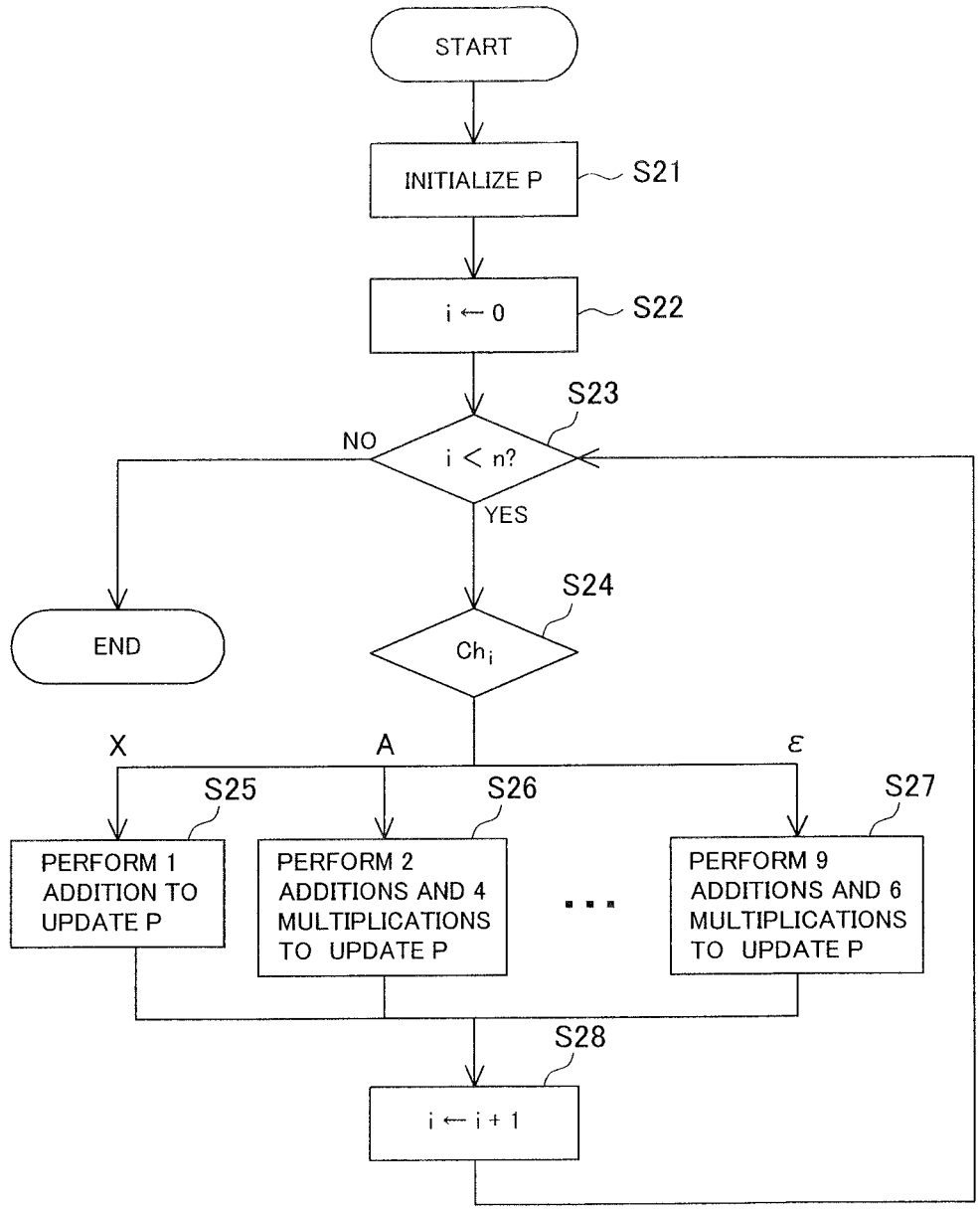
FIG. 14 is a flowchart illustrating a calculation process according to each case.

A method for calculating the tool center point vector $^{O}P_I$ or $^{O}P_R$ in the command value coordinate system by performing the calculation process according to the type of element as described above will be described below with reference to the flowchart of FIG. 14.

When calculating the tool center point vector $^{O}P_I$ or $^{O}P_R$ by performing the calculation process according to the type of element, the vector P is first initialized to the tool center point vector $^{T}P$ given by the above expression 3, as shown in S21. Next, in S22, a loop counter "i" is set to 0, and a loop is performed the number of times equal to the maximum number of nodes in the 1-chain or the R-chain (S23 to S28). In this loop, the $i^{th}$ node of each chain is read, and corresponding calculation according to the type of element is performed to update the reference vector P. The tool center point vector $^{O}P_I$ or $^{O}P_R$ is the reference vector P (the updated reference vector P) that is obtained by repeating this process until the maximum number of nodes is reached.

<Effects Obtained by Error Compensation Value Calculation Method>

The error compensation value calculation methods of the first to fourth embodiments are versatile, and allow a compensation value for a geometric error to be calculated by a common method in any type of five-axis controlled machine tool (or machine tool that controls 4 axes or less, or 6 axes or more). The error compensation value calculation methods of the first to fourth embodiments can reduce the amount of calculation, and can implement efficient calculation of a compensation value for a geometric error. Moreover, the error compensation value calculation methods of the first to fourth embodiments are methods for calculating an error compensation value for a geometric error by an inexpensive CPU mounted to machine tool in order to calculate a compensation value for a geometric error.

<Modification of Error Compensation Value Calculation Method>

The error compensation value calculation method according to the present invention is not limited to the above embodiment, and can be appropriately modified as necessary without departing from the spirit and scope of the present invention. A machine capable of using the error compensation value calculation method according to the present invention is not limited to the five-axis controlled machine tool as in the above embodiment, and a compensation value for a geometric error can be calculated by the method of the present invention even in a machine tool having four or less control axes or in a machine tool having six or more control axes. Moreover, the machine capable of using the error compensation value calculation method according to the present invention is not limited to the machine tools, and a compensation value for a geometric error can be calculated by the method of the present invention even in a robot, an industrial machine, a construction machine, etc.

The error compensation value calculation method of the present invention has advantageous effects as described above, and thus can be preferably used as a method for calculating a compensation value for a geometric error in various machines.

What is claimed is:

1. A method for calculating a compensation value that compensates for a geometric error of a machine, comprising:
    obtaining a first index representing an order of connection of drive axes in the machine and a second index representing an order of connection of the drive axes including the geometric error;
    obtaining a first vector by performing a matrix operation of a reference vector according to information on the order of connection in the first index;
    obtaining a second vector by performing the matrix operation of the reference vector according to information on the order of connection in the second index; and
    obtaining a difference between the first vector and the second vector as the compensation value.

2. A method for calculating a compensation value that compensates for a geometric error of a machine, comprising:
    obtaining a first index representing an order of connection of drive axes in the machine and a second index representing an order of connection of the drive axes including the geometric error;
    obtaining a first vector by performing a calculation process, which is associated in advance with each element in the indices according to a type of the element, on a reference vector according to information on the connection in the first index;
    obtaining a second vector by performing the calculation process on the reference vector according to information on the connection in the second index; and
    obtaining a difference between the first vector and the second vector as the compensation value.

* * * * *